April 26, 1960    I. R. LONGENECKER    2,934,052
VALVE OPERATING MECHANISM
Filed Nov. 17, 1958    5 Sheets-Sheet 1
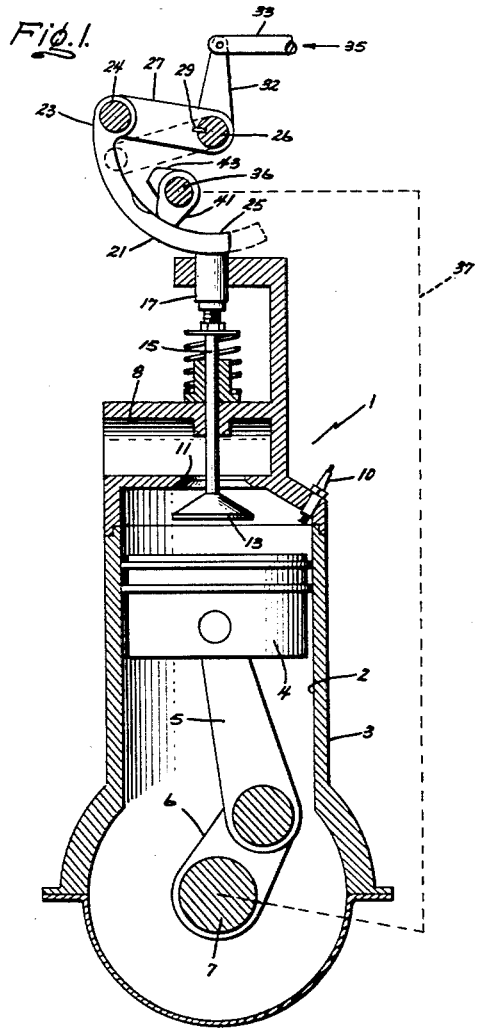
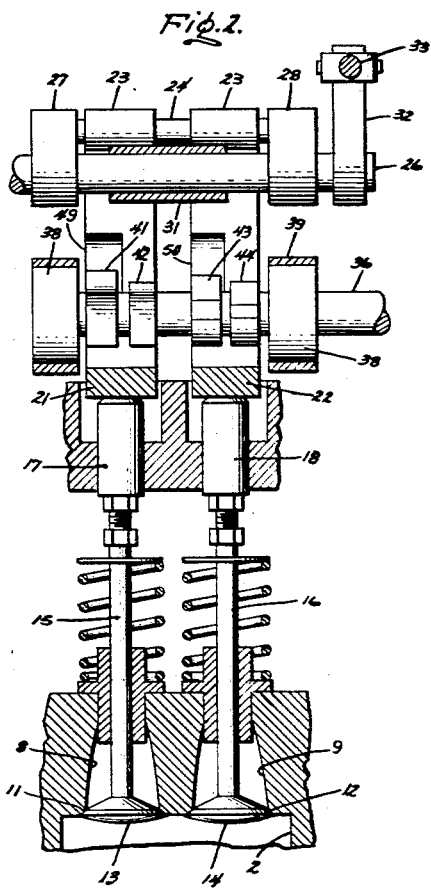
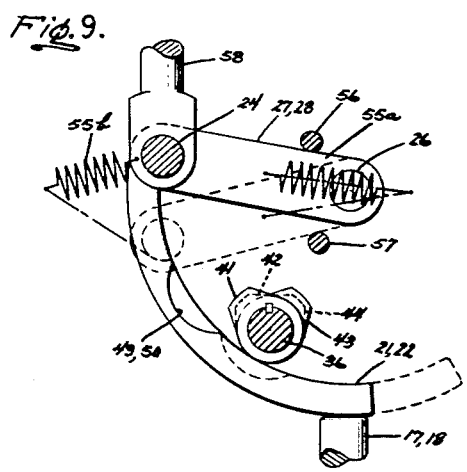
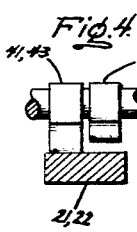
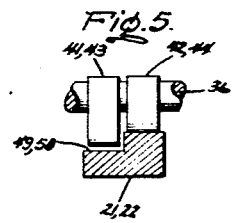
Inventor:
Irvin R. Longenecker,
by *Gust & Dish*
Attorneys.

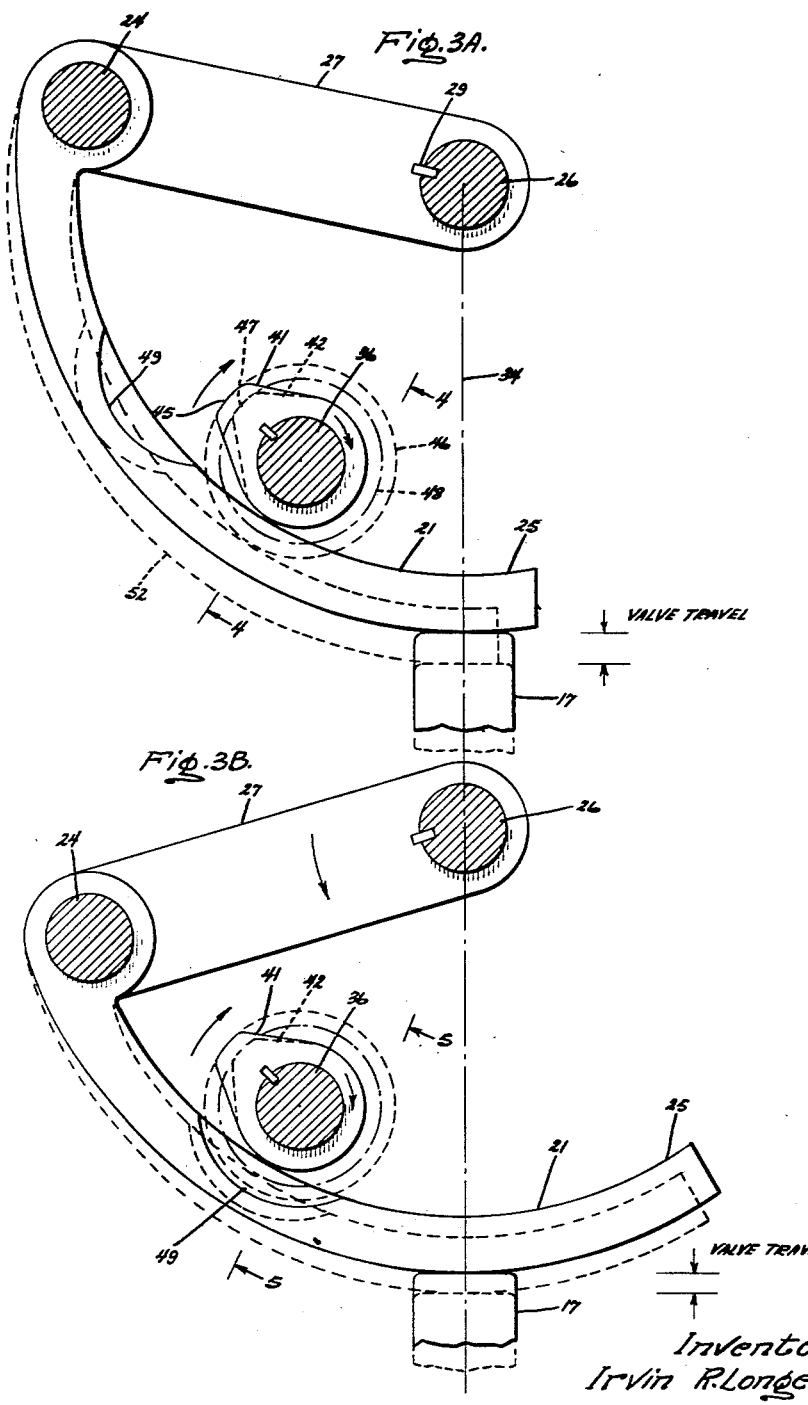

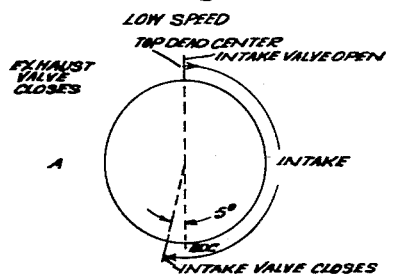
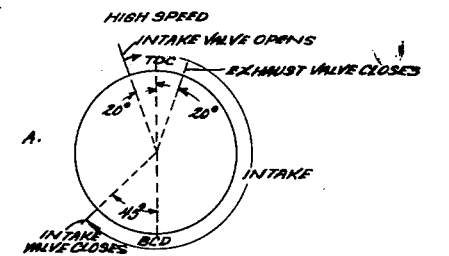
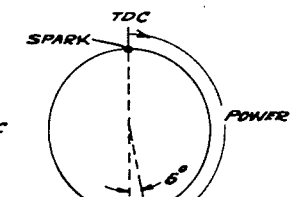
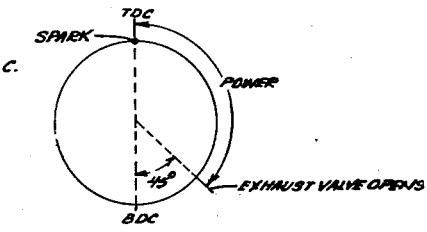
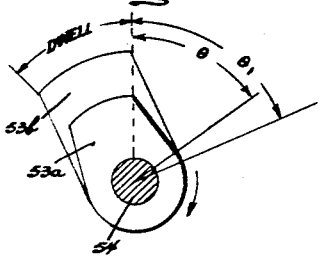

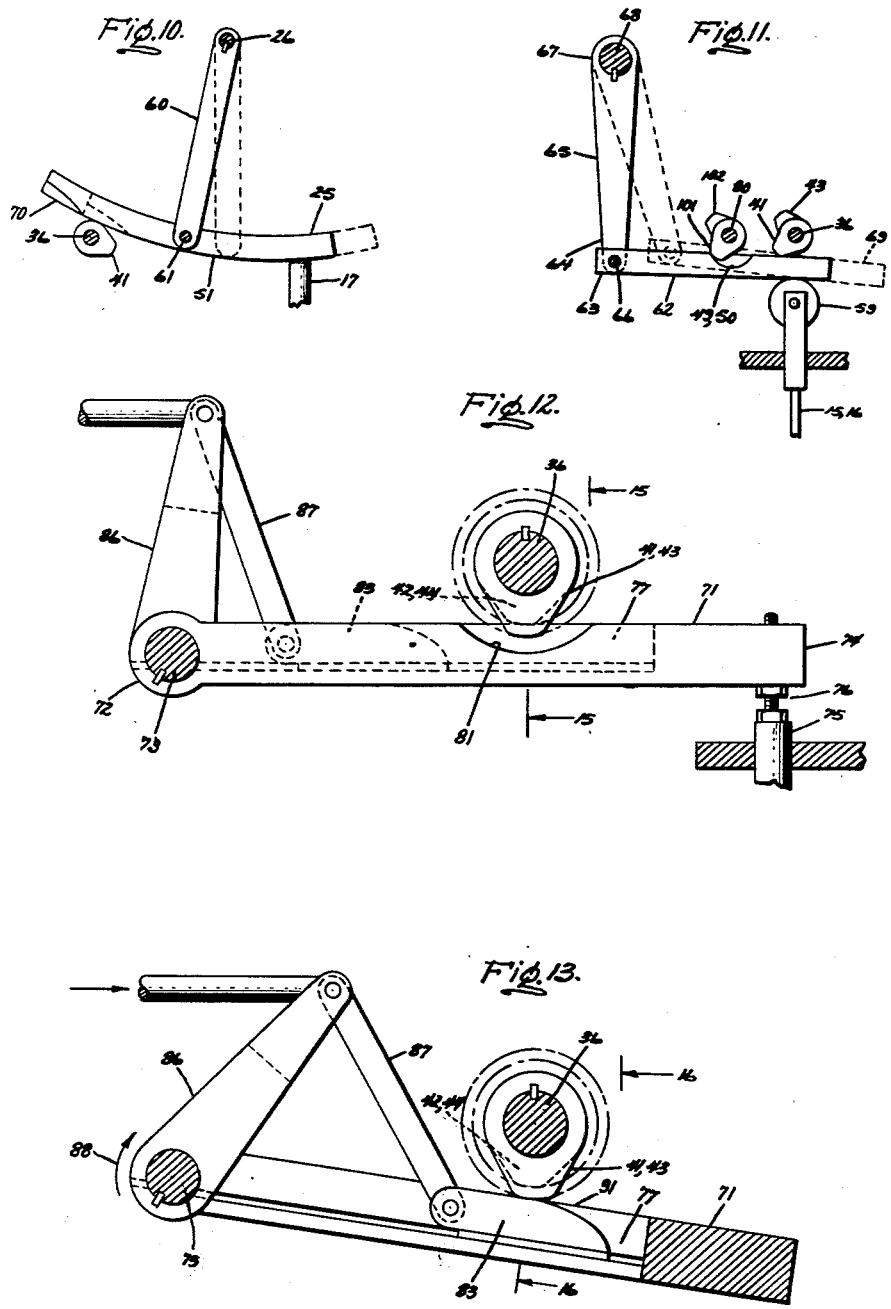

April 26, 1960
I. R. LONGENECKER
2,934,052
VALVE OPERATING MECHANISM
Filed Nov. 17, 1958
5 Sheets-Sheet 5
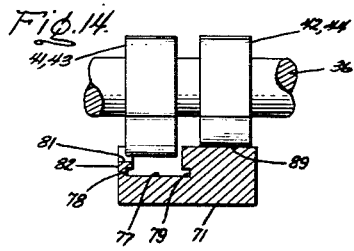
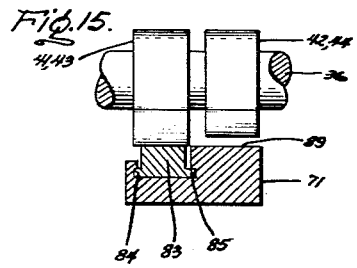
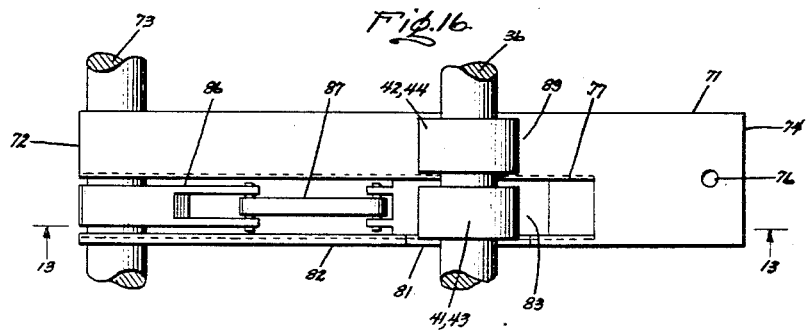
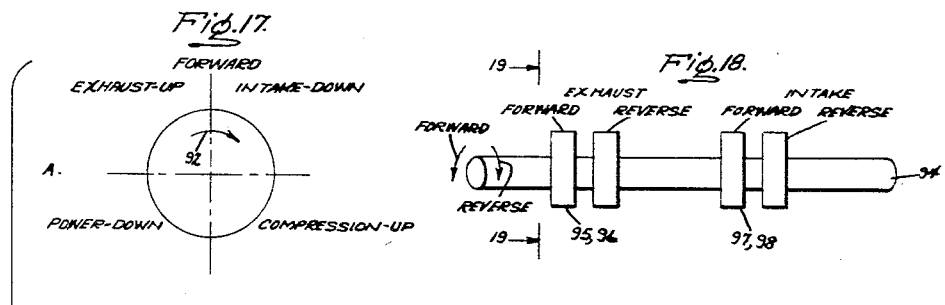
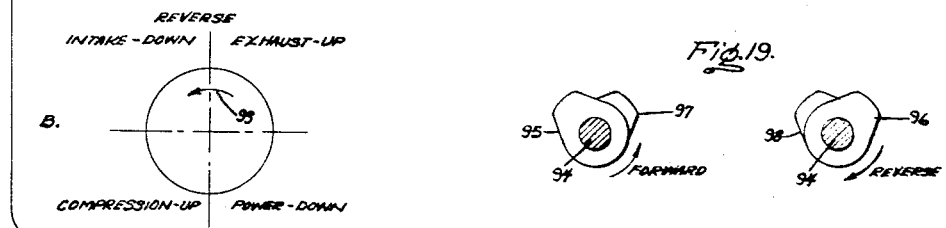
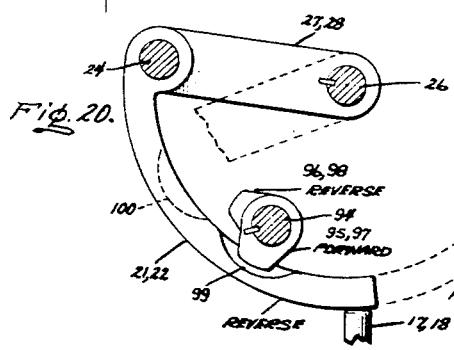
Inventor:
Irvin R. Longenecker,
by Gust & Irish
Attorneys.

United States Patent Office 2,934,052
Patented Apr. 26, 1960

2,934,052

VALVE OPERATING MECHANISM

Irvin R. Longenecker, Fort Wayne, Ind.

Application November 17, 1958, Serial No. 774,425

13 Claims. (Cl. 123—90)

This invention relates generally to valve operating mechanisms and more particularly to a mechanism for operating reciprocal poppet valves of the type used in four stroke-cycle internal combustion engines and the like.

Conventional four stroke-cycle internal combustion engines comprise a piston reciprocally disposed in a cylinder, the piston being suitably connected to a crank to impart rotary motion to a shaft responsive to reciprocal motion of the piston in the cylinder; a plurality of such cylinders and pistons are provided in a conventional engine, such as those used for automotive, marine and aircraft applications. Each cylinder of such an engine is provided with an intake port for admitting fuel thereto and an exhaust port from which the gasses resulting from combustion of the fuel in the cylinder are exhausted, and intake and exhaust valves are respectively provided for opening and closing the intake and exhaust ports at appropriate times. In the case of gasoline engines, each cylinder is provided with a spark plug for igniting the fuel whereas in diesel engines, the fuel is ignited during injection by the high temperature resulting from high compression.

In a four stroke-cycle internal combustion engine, four strokes of the piston provide a complete cycle of operation of the engine. In the first stroke, the piston moves downwardly from the top of its travel (referred to as top dead center) to the bottom of its travel (referred to as bottom dead center), the intake valve being open and the exhaust valve closed during this first stroke which is thus referred to as the intake stroke; during the intake stroke, a charge of fuel mixture is drawn into the cylinder over the piston head through the intake valve. At the end of the intake stroke, both intake and exhaust valves are closed and the piston moves upwardly to compress the fuel between the piston head and the cylinder head. At or near the top of the compression stroke, the charge of fuel is ignited, by a spark plug in the case of a spark-ignition engine, or during injection of the fuel by the heat of compression in the case of a diesel engine, and the piston then moves downwardly on the power stroke. At the bottom of the power stroke, the exhaust valve is opened with the intake valve remaining closed and the piston then moves upwardly on the exhaust stroke to force the gasses resulting from combustion of the fuel out of the exhaust port, thereby completing the cycle. The exhaust valve closes at the end of the exhaust stroke and the intake valve again opens to initiate a new cycle of operation.

The above described timing of the intake and exhaust valves would be ideal for a relatively slow speed engine only (engine speed depending upon the stroke). At high speeds, the intake charge of fuel resists movement into the cylinder due to the inertia of its mass, and thus at the bottom of the intake stroke, a partial vacuum exists instead of a cylinder full of fuel. Furthermore, at the bottom of the intake stroke, the charge of fuel has high velocity entering the cylinder and thus, if the intake valve remains open during part of the compression stroke, there will be a ramming effect to force more fuel into the cylinder. At the end of the power stroke, there is considerable pressure remaining in the cylinder, this high pressure existing during part of the exhaust stroke and thus requiring additional work in order to pump the exhaust gasses out of the cylinder. Thus, in order to relieve this high exhaust pressure condition, it is necessary to open the exhaust valve during part of the power stroke so as to allow the exhaust gasses to start moving out of the cylinder before the exhaust stroke begins. Due to the speed of the exhaust stroke, considerable velocity is imparted to the gasses exhausted through the exhaust port, and therefore it is desirable to maintain the exhaust valve open during a part of the intake stroke. Furthermore, if the intake valve is open prior to the end of the exhaust stroke, a scavenging effect takes place which aids in the removal of all of the exhaust gasses and in the entry of the new charge of fuel into the cylinder; the period between the opening of the intake valve and the closing of the exhaust valve is referred to as valve over-lap.

The valve timing which is appropriate for high speeds is, however, undesirable for low speed operation since with the intake valve open after bottom dead center, the piston will pump some of the charge of fuel back into the intake port during the compression stroke. Furthermore, the valve over-lap permits the exhaust gas to return to the cylinder after the end of the exhaust stroke, and will also permit the exhaust gasses to contaminate the new charge of fuel since the exhaust pressure is always greater than the intake pressure in a naturally aspirated engine. In addition, there is a loss of available power during part of the power stroke due to early opening of the exhaust valve.

In the design of conventional four stroke-cycle internal combustion engines intended for operation over a substantial range of speed and power, such as those employed in automotive applications, the selection of an appropriate valve timing inherently involves a compromise; high speed performance is sacrificed for low speed performance, and vice versa. It will now be readily seen that it is desirable to provide a valve operating mechanism in which the valve timing can be selectively changed. With such an arrangement, an appropriate valve timing for low speed operation and another appropriate valve timing for high speed engine operation may be provided thus considerably reducing the compromise which has heretofore been necessary in valve timing. While various arrangements have been proposed for providing variable valve timing, to the best of the present applicant's knowledge, such arrangements have either been unduly complex, have involved mechanical stress problems, or have not in fact provided suitable change of valve timing, or both. It is further desirable that such a valve timing mechanism provide fast opening and closing of the valves; the intake and exhaust valves allow the passage of fuel mixture and exhaust gasses at high efficiency only when they are in their fully open positions. It will also be readily apparent that such a mechanism for providing selectively variable valve timing will also lend itself for use in the provision of a reversible four-cycle engine, and may also be applicable to other devices employing poppet valves, such as air compressors, refrigerator compressors, or injection pumps such as diesel fuel injectors.

It is therefore a general object of my invention to provide an improved mechanism for operating valves.

Another object of my invention is to provide an improved mechanism for operating reciprocal valves of the poppet type.

A further object of my invention is to provide an improved valve operating mechanism for four stroke-cycle internal combustion engines which selectively provides at least two different valve timings.

A still further object of my invention is to provide an improved valve operating mechanism which permits reversable operation of a four stroke-cycle internal combustion engine.

Further objects and advantages of my invention will become apparent by reference to the following description and the accompanying drawings, and the features of novelty which characterize my invention will be pointed out with particularity in the claims annexed to and forming a part of this specification.

My invention in its broader aspects provides a mechanism for operating valves, such as reciprocal poppet valves of the type employed in a four stroke-cycle internal combustion engine which comprises valve operating means and first and second rotary cams respectively proportioned to provide a first and second predetermined valve timing. Cam follower means are provided cooperable with the cams for actuating the valve operating means, the cam follower means being selectively movable between a first position in which the valve operating means is actuated responsive to rotation of the first cam and a second position in which the valve operating means is actuated responsive to rotation of the second cam. In the preferred embodiment of my invention, the cam follower means is pivotally mounted and engages the valve operating means so that pivotal motion of the cam follower means imparts reciprocal motion to the valve operating means. The cam follower means is provided with at least one relieved portion formed therein and means are provided selectively movable between first and second positions, such selectively movable means in its first position exposing the relieved portion to the first cam so that the same rotates ineffectively therein with the second cam only cooperating with the cam follower means to actuate the valve operating means responsive to rotation of the same, the selectively movable means in its second position blocking the first cam from the relieved portion so that the first cam only cooperates with the cam follower means with the second cam being ineffective thereby to actuate the valve operating means responsive to the rotation of the first cam.

In the drawings:

Fig. 1 is an end cross-sectional view of a typical valve-in-head four stroke-cycle internal combustion engine equipped with the improved valve operating means of my invention;

Fig. 2 is a fragmentary side cross-sectional view further illustrating the mechanism of Fig. 1;

Fig. 3(A) and (B) illustrate the valve operating mechanism of Figs. 1 and 2 in high and low speed positions respectively;

Fig. 4 is a fragmentary view taken along the line 4—4 of Fig. 3(A) showing the mechanism in valve-open position;

Fig. 5 is a fragmentary view taken along the line 5—5 of Fig. 3(B) also showing the mechanism in valve-open position;

Figs. 6(A), (B), (C), and (D) diagrammatically illustrate a typical valve timing for a four stroke-cycle internal combustion engine at low speed;

Figs. 7(A), (B), (C), and (D) diagrammatically illustrate typical valve timing for a four stroke-cycle internal combustion engine at high speed;

Fig. 8 diagrammatically illustrates the functioning of my invention in providing faster valve opening and closing;

Fig. 9 is a fragmentary view illustrating a modified form of my invention;

Fig. 10 is another fragmentary view illustrating another modified form of my invention;

Fig. 11 is a fragmentary view illustrating another form of my invention;

Fig. 12 is a fragmentary side view showing still another modified form of my invention in the low speed position thereof;

Fig. 13 is a fragmentary cross-sectional view taken along the line 13—13 of Fig. 16 further illustrating the construction of Fig. 12 in the high speed position thereof;

Fig. 14 is a fragmentary view taken along the line 15—15 of Fig. 12;

Fig. 15 is a fragmentary view taken along the line 16—16 of Fig. 13;

Fig. 16 is a top view of the embodiment of Figs. 12 through 16;

Fig. 17 diagrammatically illustrates the valve timing required for forward and reverse directions of operation of a four stroke-cycle internal combustion engine, as referred to rotation of the cam shaft;

Fig. 18 illustrates the application of my invention to the provision of reversable engine operation;

Fig. 19 is a fragmentary view of the embodiment of Fig. 18 as viewed along the line 19—19 thereof, and Fig. 20 is a fragmentary view further illustrating the application of my invention to provide reversible engine operation.

Referring now to Figs. 1 through 5, inclusive, there is shown, in Fig. 1, a typical over-head cam shaft four stroke-cycle internal combustion engine, generally identified as 1, having a cylinder 2 formed in engine block 3. A conventional piston 4 is disposed for reciprocal up and down motion within the cylinder 2 and is connected by means of a suitable connecting rod 5 to a crank 6 formed as a part of a conventional crank shaft 7. Intake and exhaust ports 8 and 9 are formed in cylinder head 2 and are adapted to be connected respectively to suitable carburetion or fuel injection means and to a suitable exhaust manifold or air inlet in the case of a diesel engine, as is well known in the art. A conventional spark plug 10 is provided in the head of cylinder 2 for igniting the fuel therein, as is well known in the art. Valve seats 11 and 12 respectively communicate between inlet and exhaust ports 8 and 9 and the combustion chamber of cylinder 2 with intake and exhaust poppet-type valves 13 and 14 being respectively seated therein. Intake and exhaust valves 13 and 14 respectively have valve stems 15 and 16 with mechanically adjustable tappets 17 and 18 at the ends thereof, in accordance with conventional practice; it will be readily understood that hydraulic valve lifters may be equally advantageously employed with my invention. It will further be readily understood that the engine construction thus far described is conventional and is shown for illustrative purposes only, my invention being equally applicable to other forms and types of engine construction.

In order to operate intake and exhaust valves 13 and 14, and to provide two different timings therefor, the arrangement now to be described is provided. A pair of similar cam follower members 21 and 22 are provided respectively having an elongated arcuate configuration, as shown. Ends 23 of the cam follower members 21 and 22 are pivotally connected to a shaft 24 while the outer surfaces of the cam follower members 21 and 22 adjacent their ends 25 remote from shaft 24 respectively slidingly engage tappets 17 and 18, as shown. Shaft 24 with its cam follower members 21 and 22 pivotally depending therefrom is in turn supported from another shaft 26 by means of lever members 27 and 28, lever members 27 and 28 being keyed to shaft 26, as at 29. Shaft 26 is rotatably journaled in a suitable bearing 31 secured to a part of the engine frame (not shown). In the illustrated embodiment, an actuating lever member 32 is provided secured to shaft 26 and adapted to rotate the same, lever member 32 in turn having an acting rod 33 secured thereto as shown. In the illustrated embodiment, as best seen in Figs. 3(A) and 3(B), the shaft 26 is rotated about a point in axis 34 of tappets 17 and 18 and valve stems 15 and 16. It will now be seen that actuation of the actuating rod 33 of Fig. 1 in the direction shown by the arrow 35 will move lever members 27 and 28 and in turn shift cam follower members 21 and 22 from a first position as shown in solid lines in Fig. 1 and as shown in Fig.

3(A) in solid lines, to a second position, as shown in dashed lines in Fig. 1 and as shown in solid lines in Fig. 3(B), this shifting movement being in a direction generally transverse with respect to axis 34.

A cam shaft 36 is provided rotated in synchronism with the rotation of crank shaft 7 by means of any convention mechanical connection, such as suitable gearing or a chain drive, shown here by dashed lines 37. Cam shaft 36 is supported by suitable journals 38 mounted in bearings 39 in the engine frame. High and low speed intake valve cams 41 and 42 are mounted on shaft 36 on the side of cam follower member 21 remote from intake valve tappet 17 and likewise, high and low speed exhaust valve cams 43 and 44 are mounted on shaft 36 on the side of cam follower member 22 remote from exhaust valve tappet 18; it will be readily understood that cams 41, 42, 43 and 44 are secured to and rotate with the cam shaft 36, being preferably formed integrally with cam shaft 36.

High and low speed intake valve cams 41 and 42 are respectively proportioned to provide appropriate high and low speed intake valve timing and likewise, high and low speed exhaust valve cams 43 and 44 are respectively proportioned to provide appropriate exhaust valve timing. Furthermore, in the illustrated embodiment, the high speed intake and exhaust cams 41, 43 have a maximum diameter larger than the maximum diameter of the low speed intake and exhaust cams 42, 44, as best seen in Figs. 3(A) and 3(B), which illustrate the intake cams 41 and 42. Thus, referring particularly to Figs. 3(A) and 3(B), the lift portion 45 of the high speed intake valve 41 will have a larger diameter throw, as indicated in dashed lines 46 than will the lift portion 47 of the low speed intake cam 42, as indicated by the broken lines 48. It will be readily understood that the same condition prevails in the case of the high-low speed exhaust cams 43 and 44.

The cam follower members 21 and 22 are respectively provided with relieved portions or recesses 49 and 50 in one side thereof in longitudinal alignment respectively with the high speed intake and exhaust cams 41 and 43. It will now be seen that with actuating rod 33, lever member 32, lever members 27, and cam follower members 21 and 22, in their first or high speed positions, as shown in Figs. 1 and 3(A), the high speed intake and exhaust cams 41 and 43 respectively cooperatively engage the inner surfaces of the cam follower members 21 and 22 thus causing the same to pivot about shaft 24, as indicated in dashed lines 52 in Fig. 3(A) thus in turn imparting reciprocal motion to the valve tappet members 17 and 18. It will further be readily seen that by virtue of the fact that the high speed intake and exhaust cams 41 and 43 have a larger maximum diameter and thus earlier opening and later closing than do the low speed intake and exhaust cams 42 and 44, the low speed cams 42 and 44 respectively rotate ineffectively so that only the high speed intake and exhaust cams 41 and 43 operatively cooperate with the cam follower members 21 and 22, as best seen in Fig. 4.

Referring now to Fig. 3(B), it will be seen that with actuating rod 33, lever 32, lever members 27, and cam follower members 21 and 22 shifted to their second positions, recesses 49 and 50 are now in alignment respectively with the high speed intake and exhaust cams 41 and 43. It will be seen that recesses 49 and 50 are slightly deeper than the difference between the throws of the high and low speed cams, and thus, the high speed intake and exhaust cams 41 and 43 rotate freely and ineffectively in the relieved portions 49 and 50 so that only the low speed intake and exhaust cams 42 and 44 respectively cooperatively engage cam follower members 21 and 22 thereby to actuate tappet members 17 and 18 as best seen in Fig. 5.

Referring briefly now to Fig. 6, there is shown a typical valve timing for a relatively low speed, short stroke engine, for example, one developing maximum horsepower at about 2500 r.p.m. Here, as shown in Fig. 6(A), the intake valve opens simultaneously with closure of the exhaust valve at top dead center, the intake valve closing 5° past bottom dead center, with the compression stroke thus occupying the next 175° of rotation with all valves closed, i.e., from 5° past bottom dead center to top dead center, as shown in Fig. 6(B). As shown in Fig. 6(C), the spark is applied near top dead center and the power stroke then takes place, all valves still being closed, from top dead center to 5° short of bottom dead center at which point the exhaust valve opens. As shown in Fig. 6(D) the exhaust valve remains open from 5° short of bottom dead center until top dead center is then again reached.

Referring now to Fig. 7, a typical valve timing for a high speed engine, i.e., one operating with maximum horsepower at about 6000 or 7000 r.p.m. is shown. Here, as shown in Fig. 7(A), the intake valve opens 20° before top dead center with the exhaust valve still being open, not closing until 20° after top dead center. Thus, there is here a 40° valve over-lap, i.e., from 20° before until 20° after top dead center. Intake valve remains open until 45° past bottom dead center at which point the intake valve is closed and compression takes place from 45° past bottom dead center until top dead center is again reached, as shown in Fig. 7(B). The spark is then applied near top dead center with the power stroke taking place until 45° short of bottom dead center, at which point the exhaust valve opens, as shown in Fig. 7(C). As shown in Fig. 7(D), the exhaust valve then remains open from 45° short of bottom dead center until 20° past top dead center. With the foregoing in mind, it will be readily understood that the high and low speed intake valves 41 and 42 may readily be proportioned respectively to provide the intake valve opening and closing action shown in Figs. 6 and 7, and likewise the high and low speed exhaust valves 43 and 44 may be proportioned respectively to provide the high and low speed exhaust valve opening and closing shown in Figs. 6 and 7. It is here to be understood that the specific high and low speed valve timings suggested in Figs. 6 and 7 are by way of illustration only, and that high and low speed valve timings other than those shown may be required in any specific engine design. The specific configurations of the high and low speed intake cams 41 and 42 and the high and low speed exhaust cams 43 and 44 shown in Figs. 3(A) and (B) and elsewhere in the drawings are therefore for illustrative purposes only.

Referring now again to Figs. 1, 3(A) and 3(B), it will be seen that the center line of the rotatable cam shaft 36 is disposed between the axis 34 and the shaft 24. It is thus seen that some considerable mechanical advantage or mechanical amplification is provided in the cooperative relationship of the cams 41, 42, 43 and 44, and the cam follower members 21 and 22 respectively, i.e., cams 41, 42, 43 and 44 are not required to have as great a throw or lift as would otherwise be required to provide the requisite valve opening if the cam follower members 21 were not interposed therebetween.

Referring briefly now to Fig. 8, a pair of cams 53a and 53b are shown mounted on a common shaft 54 and having the same dwell period, i.e., if these cams were applied to actuate the valves of the previous figures of the drawing, each would maintain the valve open for the same period of time. It will be readily seen, however, that the smaller cam 53a will open the valve during angular rotation shown by the angle $\theta$ whereas the larger cam 53b requires a greater angular motion $\theta_1$ to accomplish complete valve opening. It is thus seen that a smaller cam, while providing the same dwell period, nevertheless inherently provides faster valve opening and closing action than a larger cam. Thus, as indicated, with my invention and the mechanical amplification provided by the lever-like cam follower members 21 and 22, smaller cams may be employed to provide the same amount of valve opening, such smaller cams providing inherent faster valve opening and closing than would be provided with direct engagement of the cams with the valve tappets.

It will further be observed, with particular reference to Figs. 3(A) and (B) that the high speed position of lever members 21 and 22 is that shown in Fig. 3(A), i.e., with tappet members 17 and 18 engaging lever members 21 and 22 immediately adjacent their ends 25, whereas the low speed position is that shown in Fig. 3(B) with the tappet members 17 and 18 engaging a point on the cam follower members 21 and 22 spaced from their ends 25 toward the shaft 24. It will also be observed that in the illustrated embodiment, the low speed cams 42 and 44 are made smaller than the high speed cams 41 and 43. This specific arrangement is provided in order to provide the greater mechanical advantage at low speed and the least inertia of the end 25 of the cam follower members 21 and 22 at high speed.

Referring now briefly to Fig. 9 in which like elements are indicated by like reference numerals, one relationship of the high and low speed intake cams 41 and 42 to the high and low speed exhaust cams 43 and 44 to provide the valve timing of Figs. 6 and 7 is suggested. Here, the use of suitable over center springs 55a and 55b connected between lever members 27, 28 and fixed points remote from shaft 36, as shown, is suggested in order to maintain lever members 27, 28 and the cam followers 21, 22 in either one of their two positions. The provision of appropriate stops 56 and 57 to limit the travel of lever members 27, 28 and thus the shift of cam follower members 21, 22 is also suggested. Furthermore, it will be readily seen that cam follower members 21, 22 may be shifted from their first positions, as shown in Fig. 3(A), into their second positions, as shown in Fig. 3(B), by means of an actuating rod 58 operatively and pivotally connected to the shaft 24, as shown. In addition, other means for effecting movement of lever members 27, 28 and cam follower members 21, 22 from their first to their second positions will readily suggest themselves to those skilled in the art.

Referring now to Fig. 10 in which like elements are still indicated by like reference numerals, there is shown an arrangement in which the forces exerted by the cams and the tappet are nearly equalized. Here a cam follower member 51 is provided pivotally connected approximately midway between its ends by shaft 61 to a lever member 60 which in turn is connected to shaft 26. Recessed portion 70 is provided at the end of cam follower member 51 remote from its end 25 which engages tappet 17. In its high speed position, as shown in solid lines in Fig. 10, high speed intake cam 41 cooperates with cam follower member 51 causing it to pivot about shaft 61 thereby to actuate the tappet member 17. When lever member 60 is moved to its second position, as shown in dashed lines in Fig. 10, thereby shifting cam follower member 51 transversely of the reciprocal tappet 17, as also shown in dashed lines, high speed cam 41 is in alignment with the recess 70, rotating ineffectively therein with the low speed cam (not shown) as in the case of the previous embodiments, cooperatively engaging cam follower member 51 to again cause it to pivot about pin 61 to actuate tappet 17. It will be understood that shaft 26 may be rotated to shift lever member 60 and cam follower member 51 from their first or high speed to their second or low speed positions in any manner hereinbefore described. It will, of course, be readily understood that an identical arrangement will be employed for actuating the exhaust valve tappet 18 (not shown).

Referring now to Fig. 11, in which a roller tappet 59 is employed. Here, the cam follower member 62 is straight, rather than being arcuate as in the case of the Figures 1 through 5 and 9. Here, end 63 of cam follower member 62 is pivotally connected to one end 64 of lever member 65 by shaft 66 with the other end 67 of lever member 65 being connected to actuating shaft 68. While the previously described embodiments of my invention have shown both high speed and low speed cams mounted or formed on a common cam shaft, it will be readily comprehended that in certain instances it may be desirable to provide two cam shafts with the high speed cams being mounted on one such shaft and the low speed cams being mounted on the other cam shaft. Such an arrangement is shown in Fig. 11 in which the high speed intake and exhaust cams 41, 43 are mounted on high speed cam shaft 36 while the low speed intake and exhaust cams 101, 102 are mounted on low speed cam shaft 80. Here it will be seen that the high speed cams 41, 43 are in alignment with the valve stems 15, 16 to which roller tappets 59 are connected, on the side of cam follower members 62 remote from roller tappets 59. Relieved or recessed portions 49, 50 are again provided in cam follower member 62 intermediate its ends. It will now be readily seen that rotation of actuating shaft 68 by any suitable means, such as those suggested in the previous figures, will cause cam follower member 62 to move transversely of the axis of the tappets 15, 16 from its first position shown in solid lines in Fig. 11 to its second position as shown in dashed lines 69. In the first or high speed position of cam follower member 62, the high speed cams 41, 43 are effective, cooperatively engaging cam follower member 62 to cause it to pivot about its connection 66 with lever member 65 thereby to actuate roller tappets 59 with low speed cams 101, 102, which may in this embodiment have the same maximum diameter and thus the same throw as high speed cams 41, 43, rotating ineffectively in recesses 49, 50, respectively. With cam follower member 62 shifted to its second position, as shown in the dashed lines 69, the high speed cams 41, 43 will be in alignment with and ineffectively rotate in recesses 49, 50, respectively, with the low speed cams 101, 102 cooperatively engaging cam follower member 62, thereby to actuate the roller tappet 59. It will be observed that in this embodiment, mechanical advantage is provided in the second or low speed position.

Referring now to Figs. 12 through 17 in which like elements are still indicated by like reference numerals, I have here provided a cam follower member 71 having one end 72 pivotally connected to a fixed shaft 73 and its other end 74 arranged to have an adjustable connection with valve stem member 75 as by adjustable screw 76. A longitudinally extending elongated slot 77 is formed in the cam follower member 71 extending outwardly from end 72 to a point short of end 74. Grooves or guide slots 78, 79 are provided in each side of the slot 77, as best seen in Fig. 15. A relieved portion 81 may also be provided in side wall 82 of cam follower member 71 communicating with the longitudinal slot 77.

A slide member 83 is provided disposed for sliding motion in the slot 77 and having flanges 84 and 85 disposed in slots 78 and 79 in order to guide the slide member 83 for longitudinal movement in the slot 77. Slide member 83 is moved from a first position, as shown in dashed lines in Fig. 12, to a second position shown in solid lines in Fig. 13, by means of a first lever member 86 having one end secured to shaft 73 with another lever member 87 interconnecting the other end of lever 86 to slide member 83, as shown. It will now be readily seen that rotation of shaft 73 in the direction shown by the arrow 88 in Fig. 13 will, through the cooperation of lever members 86 and 87, cause the slide member 83 to slide in the grooves 78, 79 from its first position as shown in Fig. 12 to its second position as shown in Fig. 13. It will further be readily seen that slide 83 in its second position as shown in Fig. 13 and as further shown in Fig. 16, effectively blocks the relieved portion 81, whereas in its first position as shown in Figs. 12 and 15, relieved portion 81 is exposed.

Here again, high speed intake and exhaust cams 41, 43, are provided, together with low speed intake and exhaust cams 42, 44 mounted for rotation with cam shafts 36a. It will now be seen that with slide member 83 in its first or inner position, as shown in Figs. 12 and 14, the high speed intake and exhaust cams 41, 43 will rotate freely and ineffectively in recess 81 and slot 77 with the low speed cams 42, 44 thus cooperatively engaging portion 89 of cam follower member 71 thereby to cause the same to pivot about shaft 73 and to reciprocally actuate valve tappet 75. Likewise, it will be readily seen that with the slide member 83 in its second or outermost position, as shown in Fig. 13, recess 81 and slot 77 are blocked, thereby causing the larger high speed intake and exhaust cams 41, 43 to engage the upper surface 91 of slide 83 with the low speed intake and exhaust cams 42, 44 rotating ineffectively, as best seen in Fig. 15.

Turning now briefly to Fig. 17, it will be seen in Fig. 17(A), and with rotation in the forward direction as shown by the arrow 92, the intake stroke first takes place on a downward stroke, compression next takes place on an upward stroke, the power stroke occurs on a downward stroke, and the exhaust stroke lastly takes place on an upward stroke, each stroke occurring during 90° of cam rotation. As seen in Fig. 17(B), representing cam shaft rotation for reverse direction of rotation, as shown by the arrow 93, the sequence of operation is the same as that shown in Fig. 17(A), but in the opposite sense.

Referring now to Fig. 18, it will be seen that a single cam shaft 94 is provided having a pair of forward and reverse exhaust cams 95, 96, respectively, and a pair of forward and reverse intake cams 97, 98, respectively. Referring now to Fig. 19, it will be seen that the exhaust cams 95, 96 and the intake cams 97, 98 are respectively disposed as shown, the exhaust and intake cams 95, 97 cooperating to provide rotation in the forward direction, and exhaust and intake cams 96, 98 cooperating to provide rotation in the reverse direction.

Referring now to Fig. 20 in which like parts are still indicated by like reference numerals, it will be seen that the cam follower members 21, 22 are here provided with two recesses or relieved portions 99 and 100 respectively spaced apart longitudinally and transversely so as to be longitudinally in alignment with forward exhaust and intake cams 95, 97 and reverse exhaust and intake cams 96, 98. It will thus be seen that with actuating shaft 26, lever members 27, 28, and cam follower members 21, 22 in their first or reverse positions, as shown in solid lines in Fig. 20, the forward cams 95, 97 will freely and ineffectively rotate in the relieved portions 99 so that the reverse exhaust and intake cams 96, 98 cooperatively engage cam follower members 21, 22 respectively to actuate the tappet members 17, 18. Likewise, with actuating shaft 26 rotated so as to shift the lever members 27, 28, the cam follower members 21, 22 to their second or forward positions, as shown in dashed lines in Fig. 20, the reverse exhaust and intake cams 96, 98 will now freely and ineffectively rotate in the relieved portions 100 with the forward exhaust and intake cams 95, 97 cooperatively engaging cam follower members 21, 22, thereby to reciprocally actuate tappet members 17, 18, respectively.

It will now be seen that I have provided an extremely simple mechanism for selectively shifting from one valve timing to another; such dual valve timing may be to provide either optimum valve opening and closing for two different predetermined speeds, or, as explained above, to provide forward and reverse directions of rotation. It will further be readily undestood that many means for actuating my valve timing mechanism at predetermined desired speeds will occur to those skilled in the art. Thus, my improved valve operating mechanism may be shifted from one position to another by means of suitable speed responsive mechanisms, or in the alternative, may be operator controlled so as to be shifted when desired.

While I have illustrated and described specific embodiments of my invention, further modifications and improvements will occur to those skilled in the art and I desire therefore in the appended claims to cover all modifications which do not depart from the spirit and scope of this invention.

What is claimed is:

1. Mechanism for operating valves comprising: valve operating means; a first rotary cam proportioned to provide a first predetermined valve timing; a second rotary cam proportioned to provide a second predetermined valve timing; and cam follower means cooperable with said cams and engaging said valve operating means for actuating the same; said cam follower means being selectively movable between a first position cooperating with said first cam so that said valve operating means is actuated responsive to rotation of said first cam only, and a second position cooperating with said second cam so that said valve operating means is actuated responsive to rotation of said second cam only.

2. Mechanism for operating reciprocal poppet valves comprising: reciprocal valve operating means; a first rotary cam proportioned to provide a first predetermined valve timing; a second rotary cam proportioned to provide a second predetermined valve timing, cam follower means cooperable with said cams and engaging said valve operating means for actuating the same; said cam follower being movable transversely of said valve operating means between a first position cooperating with said first cam so that said valve operating means is actuated responsive to rotation of said first cam and said second cam is ineffective, and a second position cooperating with said second cam so that said valve operating means is actuated responsive to rotation of said second cam and said first cam is ineffective; and means for selectively shifting said cam follower means between said first and second positions.

3. Mechanism for operating reciprocal poppet valves comprising: reciprocal valve operating means; a first rotary cam proportioned to provide a first predetermined valve timing; a second rotary cam proportioned to provide a second predetermined valve timing; pivotally mounted cam follower means cooperable with said cams and engaging said valve operating means whereby pivotal motion of said cam follower means imparts reciprocal motion to said valve operating means, said cam follower means having at least one relieved portion formed therein; and means selectively movable between first and second positions, said selectively movable means in said first position thereof exposing said relieved portion to said first cam whereby the same rotates ineffectively therein so that said second cam only cooperates with another portion of said cam follower means thereby to actuate said valve operating means responsive to rotation of said second cam, and in said second position thereof blocking said first cam from said relieved portion so that said first cam only cooperates with said cam follower means with said second cam ineffective thereby to actuate said valve operating means responsive to rotation of said first cam.

4. Mechanism for operating reciprocal poppet valves comprising: reciprocal valve operating means; a first rotary cam proportioned to provide a first predetermined valve timing; a second rotary cam proportioned to provide a second predetermined valve timing; an elongated pivotally mounted cam follower member engaging said valve operating means adjacent one end thereof whereby pivotal motion of said cam follower member imparts reciprocal motion to said valve operating means, said cam follower member having at least one relieved portion formed therein; said cam follower member being movable transversely of said valve operating means between a first position in which said first cam is exposed to said relieved portion and rotates ineffectively therein and with said second cam only cooperating with said cam follower member thereby to actuate said valve operating means responsive to rotation of said second cam, and a second position in which said relieved portion is shifted away from said first cam with said first cam only cooperating with said cam follower member and with said second cam rotating ineffectively thereby to actuate said valve operating means responsive to rotation of said first cam.

5. The combination of claim 4 in which said first and second cams are mounted on a common shaft disposed inwardly from said one end of said cam follower member and from the axis of said valve operating means, and on the side of said cam follower member remote from said valve operating means.

6. The combination of claim 4 in which said cam follower member is arcuate.

7. In a four stroke-cycle internal combustion engine, mechanism for selectively providing two different timings for reciprocal poppet valves comprising: reciprocal valve operating means; a first rotatable cam proportioned to provide a first valve timing; a second rotatable cam proportioned to provide a second valve timing, said first cam having a larger maximum diameter than the maximum diameter of said second cam; an elongated cam follower member disposed between said cam and said valve operating means; a lever member having one end pivotally fixed and having one end of said cam follower member pivotally connected to its other end, the other end of said cam follower member engaging said valve operating means whereby pivotal motion of said cam follower member imparts reciprocal motion to said valve operating means; said cam follower member having a relieved portion formed therein; said lever member being selectively movable transversely of said valve operating means thereby to shift said cam follower member between first and second positions; said cam follower member in said first position thereof having said relieved portion in alignment with said first cam so that the same rotates ineffectively therein and said second cam only cooperatively engages said cam follower member whereby said valve operating member is actuated responsive to rotation of said second cam, said cam follower member in said second position thereof having said relieved portion out of alignment with said first cam so that said first cam only cooperatively engages said cam follower member and said second cam rotates ineffectively whereby said valve operating member is actuated responsive to rotation of said first cam.

8. The combination of claim 7 in which said cam follower member is arcuate with said relieved portion being formed in the inner surface thereof and said valve operating means engaging the outer surface thereof, in which said one end of said lever member is on a common axis with said valve operating means, and in which said cams are mounted on a common shaft disposed intermediate said axis and said one end of said cam follower member.

9. In a four stroke-cycle internal combustion engine, reciprocal poppet valve operating mechanism for providing selectively reversable operation of said engine comprising: reciprocal valve operating means; a first rotatable cam proportioned to provide engine operation in one direction of rotation, a second rotatable cam proportioned to provide engine operation in the opposite direction of rotation; pivotally mounted cam follower means cooperable with said cams and engaging said valve operating means whereby pivotal motion of said cam follower means imparts reciprocal motion to said valve operating means; said cam follower means having first and second longitudinally and transversely spaced apart relieved portions formed therein; and means selectively movable between first and second positions, said selectively movable means in said first position thereof exposing said first relieved portion to said first cam whereby the same rotates ineffectively therein and blocking said second cam from said second relieved portion so that said second cam only cooperates with said cam follower means thereby to actuate said valve operating means responsive to rotation of said second cam, said selectively movable means in said second position thereof exposing said second relieved portion to said second cam whereby the same rotates ineffectively therein and blocking said first cam from said first relieved portion so that said first cam only cooperates with said cam follower means thereby to actuate said valve operating means responsive to rotation of said first cam.

10. In a four stroke-cycle internal combustion engine, reciprocal poppet valve operating mechanisms for providing selectively reversable operation of said engine comprising: reciprocal valve operating means; a first rotatable cam proportioned to provide engine operation in one direction of rotation, a second rotatable cam proportioned to provide engine operation in the opposite direction of rotation; a lever member having one end fixedly pivoted; an elongated cam follower member having one end pivotally connected to the other end of said lever member and engaging said valve operating means adjacent its other end whereby pivotal motion of said cam follower member imparts reciprocal motion to said valve operating means; said cam follower member having first and second longitudinally and transversely spaced relieved portions formed therein; said lever member being selectively movable thereby to shift said cam follower member transversely of said valve operating means between first and second positions; said cam follower member in said first position thereof having said first cam in alignment with said first relieved portion and rotating ineffectively therein and said second cam out of alignment with said second relieved portion so that said second cam only cooperatively engages said cam follower member thereby to actuate said valve operating means responsive to rotation of said second cam; said cam follower member in said second position thereof having said second cam in alignment with said second relieved portion and rotating ineffectively therein and said first cam out of alignment with said first relieved portion so that said first cam only cooperatively engages said cam follower member thereby to actuate said valve operating means responsive to rotation of said first cam.

11. Mechanism for operating reciprocal poppet valves comprising: reciprocal valve operating means; a first rotary cam proportioned to provide a first predetermined valve timing; a second rotary cam proportioned to provide a second predetermined valve timing; an elongated cam follower member having one end pivoted and engaging said valve operating means adjacent its other end whereby pivotal motion of said cam follower member imparts reciprocal motion to said valve operating means, said cam follower member having at least one elongated longitudinally extending slot formed therein; and a member selectively movable in said slot between first and second positions; said last-named member in its first position cooperatively engaging said first cam with said second cam rotating ineffectively so that said cam follower member actuates said valve operating means responsive to rotation of said first cam; said last-named member in its second position exposing said slot to said first cam so that the same rotates ineffectively therein and said second cam cooperatively engages said cam follower member so that said cam follower member actuates said valve operating means responsive to rotation of said second cam.

12. Mechanism for operating reciprocal poppet valves comprising: reciprocal valve operating means; a first rotary cam proportioned to provide a first predetermined valve timing; a second rotary cam proportioned to provide a second predetermined valve timing, said first and second cams being mounted on a common cam shaft; said first cam having a greater maximum diameter than said second cam; an elongated cam follower member having one end pivotally connected to shaft means and having its other end engaging said valve operating means whereby pivotal motion of said cam follower member imparts reciprocal motion to said valve operating means; said cam follower member having an elongated slot formed therein extending longitudinally from said shaft means, said slot being in alignment with said first cam; a slide member selectively slidably movable in said slot transversely of said valve operating means between first and second positions; a first lever member having one end connected to said shaft means; and a second lever member connecting the other end of said first lever member and said slide member whereby the same is moved between said first and second position thereof; said slide member in said first position thereof being in alignment with and cooperatively engaging said first cam so that said second cam rotates ineffectively and said cam follower member actuates said valve operating means responsive to rotation of said first cam, said slide member in said second position being out of alignment with said first cam so that the same rotates ineffectively in said slot and said second cam cooperatively engages said cam follower member whereby said cam follower member actuates said valve operating means responsive to rotation of said second cam.

13. Mechanism for operating reciprocal poppet valves comprising: reciprocal valve operating means; a first rotary cam proportioned to provide a first predetermined valve timing; a second rotary cam proportioned to provide a second predetermined valve timing; an elongated cam follower member pivotally mounted intermediate its ends and engaging said valve operating means adjacent one end thereof whereby pivotal motion of said cam follower member imparts reciprocal motion to said valve operating means, said cam follower member having at least one relieved portion formed therein adjacent its other end; said cam follower member being movable transversely of said valve operating means between a first position in which said first cam is exposed to said relieved portion and rotates ineffectively therein and said second cam only cooperates with said cam follower member thereby to actuate said valve operating means responsive to rotation of said second cam, and a second position in which said relieved portion is shifted away from said first cam with said first cam only cooperating with said cam follower member and said second cam rotating ineffectively thereby to actuate said valve operating means responsive to rotation of said first cam.

References Cited in the file of this patent

UNITED STATES PATENTS

| | | |
|---|---|---|
| 2,025,245 | Oetzel | Dec. 24, 1935 |
| 2,260,983 | Walker | Oct. 28, 1941 |
| 2,565,022 | Hattink | Aug. 21, 1951 |

FOREIGN PATENTS

| | | |
|---|---|---|
| 6,659 | Great Britain | Mar. 25, 1908 |
| 646,404 | Great Britain | Nov. 22, 1950 |
| 1,087,533 | France | Aug. 25, 1954 |